United States Patent [19]

Fitzgibbon et al.

[11] Patent Number: 4,582,552

[45] Date of Patent: Apr. 15, 1986

[54] CARTON FORMING APPARATUS

[75] Inventors: Maxwell A. Fitzgibbon; Graham E. Waite; Gregory T. Jones, all of Brisbane, Australia

[73] Assignee: James Hardie Containers Limited, Rocklea, Australia

[21] Appl. No.: 653,225

[22] PCT Filed: Jan. 16, 1984

[86] PCT No.: PCT/AU84/00008

§ 371 Date: Sep. 11, 1984

§ 102(e) Date: Sep. 11, 1984

[87] PCT Pub. No.: WO84/02878

PCT Pub. Date: Aug. 2, 1984

[30] Foreign Application Priority Data

Jan. 18, 1983 [AU] Australia .............................. PF7659

[51] Int. Cl.[4] ............................................... B29C 5/00

[52] U.S. Cl. ................................... 156/217; 156/227; 156/443; 493/151; 493/177; 493/178

[58] Field of Search ............................... 493/126-128, 493/141, 151, 177-178, 311; 229/41 B, 41 R; 156/226, 227, 443, 538, 217

[56] References Cited

U.S. PATENT DOCUMENTS

| | | | |
|---|---|---|---|
| 1,926,364 | 2/1931 | Bergstein . | |
| 2,125,147 | 7/1958 | Bergstein | 493/178 X |
| 2,899,872 | 8/1959 | Labombarde | 493/177 X |
| 3,884,130 | 5/1975 | Stolkin et al. | 493/151 X |
| 4,319,878 | 3/1982 | Dozier | 493/177 X |

*Primary Examiner*—David Simmons

*Attorney, Agent, or Firm*—Larson and Taylor

[57] ABSTRACT

An improved crash-lock carton forming apparatus having three carton forming stations (44, 60 and 80). The first station (44) has engagement means comprising a pair of transversely spaced lifting arms (**45, 45*a*) for lifting two flaps (20, 21) of the carton (12) and folding the flaps against side panels (14, 15) of the carton (12) and ploughs (49, 49*a*) for folding connector tabs (24, 25) in the reverse direction to that of the panels (14, 15). Second station (60) downstream of the first includes engagement means comprising lifting arms (61, 61*a*) for lifting and folding flaps (19, 22) in the same direction as the first two flaps (20, 21). A bonding station is adjacent the second station (60) for applying bonding agent to the tabs (24, 25). The third station (80) lifts and folds the remaining two flaps (19, 22) against associated ones of the side panels (13, 16). First and second holding and conveying means (51, 52 and 70, 71) for conveying the blank (12**) through the apparatus.

13 Claims, 11 Drawing Figures

CARTON FORMING APPARATUS

This invention relates to carton forming apparatus.

In particular, the invention concerns an improved carton forming apparatus and a carton apparatus conversion method to provide the improved apparatus of the invention.

The method of the invention will be described in relation to its applicability to an S&S model ZLM machine. However, it should be appreciated that this is by way of example only and that the method of the invention is also applicable to machines of a similar nature to this.

The apparatus for forming such cartons in general is relatively complex and expensive and there are many factories throughout the world which have installed forming apparatus for forming the conventional regular slotted containers which have been widely used for many years. The various types of forming apparatus presently available for forming the regular slotted containers cannot be used to form the crash lock cartons. Thus entirely separate machines must be installed for this purpose. The cost of these machines is in the order of a quarter of a million dollars.

In the process of forming crash lock cartons, base panels thereof having connector tabs connecting them to adjacent side panels, have to be folded during the manufacturing process in a first direction towards the remaining body part of the blank while the connector tabs have to be folded in the reverse direction to their associated side panel for bonding to an adjacent side panel. Machines for forming regular slotted containers do not have this facility.

It is an object of the invention to provide an improved carton forming apparatus and a carton apparatus conversion method for providing an improved apparatus which alleviates the above mentioned disadvantages. Other objects and advantages of the invention will hereinafter become apparent.

Accordingly, the present invention provides an improved crash-lock carton forming apparatus for forming from a blank, a knocked-down carton having side panels and closure flaps, two of the closure flaps having depending connection tabs, the apparatus having exit rollers from a printing station at an upstream end and a downstream end at which formed knocked-down cartons may be removed, said apparatus further including:

a first carton forming station downstream of the exit rollers, said first station having engagement means for lifting two of the flaps and folding said two flaps against associated side panels and folding the connection tabs in the reverse direction to the direction of folding of the two flaps;

a second forming station downstream of said first station and including engagement means for lifting the remaining two flaps in the same direction as the lifting of the first two flaps and folding the remaining two flaps against associated ones of the side panels;

bonding station for applying bonding agent to said connector tabs;

a third forming station for folding the outer two side panels over onto the inner two side panels to thereby bond the remaining two flaps to respective ones of the connector tabs;

first holding and conveying means adjacent said first station for engaging outer side panels and associated closure flaps and conveying the blank towards the downstream end of the apparatus; and second holding and conveying means adjacent said second forming station and upstream of said third forming station for engaging the blank and conveying it to said third forming station.

According to another aspect, the invention provides a method of converting a carton forming machine of the type which bonds a joining flap to a side panel of a regular slotted carton or half slotted carton into a machine for forming known down crash-locked cartons, the machine having holding and conveying means extending from adjacent exit rollers of a printing station at an upstream end to a downstream location terminating upstream of a forming station for folding the blank to bond the joining flap to the side panel of the blank, said method including the steps of:

replacing the holding and conveying means with first and second holding and conveying means, said first conveying means being upstream of said second conveying means;

positioning first engagement means adjacent said first conveying means, said first conveying means and said firs engagement means providing a first station at which two of the flaps of the blank are lifted and folded against the associated side panels whilst folding connector tabs associated with the flaps in the reverse direction to the direction of folding of the two flaps;

providing first engagement means downstream of the exit roller and adjacent said first conveying means to form a first carton forming station for lifting two of the flaps of the blank and folding them against associated side panels and folding connector tabs of blank in the reverse direction to the folding of the two flaps;

providing second engagement means adjacent said second conveying means to form a second carton forming station for lifting the remaining two flaps of the blank and folding them against the associated side panels; and, providing a third carton forming station for folding two outer side panels over onto the inner two side panels to thereby bond the outer two flaps to respective ones of the connectors tabs.

The engagement means may be normally disposed in an inoperative attitude so that the carton blanks from which the containers are formed may be fed along the apparatus. The engagment means may be moved into the operative position by the blank as it progresses through the apparatus and return to the inoperative position under the influence of gravity once the blank has progressed sufficiently.

The engagement means may each comprise a freely pivotable hook adapted to extend into the blank conveying path to engage selected closure flaps of the blank and pivot them rearwardly as the carton blank is conveyed and a co-operating fixed anvil or plough members adapted to engage the connector tabs as the associated flaps are pivoted to cause the connector tab to pivot in the opposite direction with respect to the flap. The mounting means for the hook and the anvil is preferably selectively adjustable to suit carton blanks of various configurations.

In order that the invention may be more readily understood and put into practical effect, reference will now be made to the accompanying drawings which illustrate a preferred embodiment of the invention, wherein:

FIG. 1 is a profile of a typical blank for a crash-lock carton;

FIG. 2 illlustrates the assembly of this carton;

Figure 1:
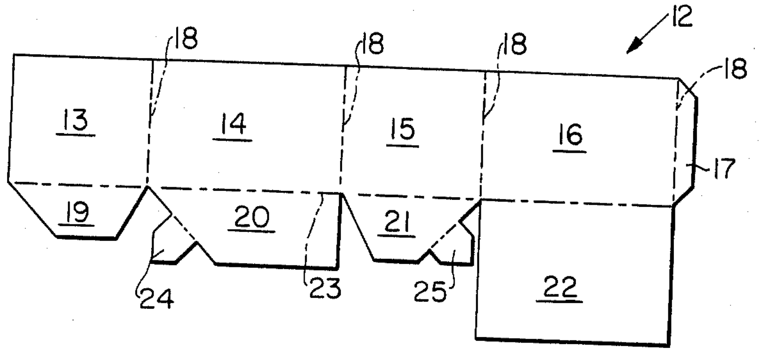
Figure 2:
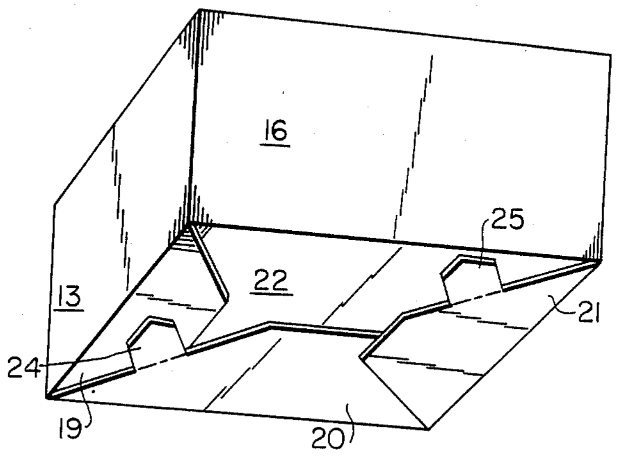

A typical crash lock carton blank 12 has side panels 13, 14, 15 and 16. Panel 16 has a joining flap 17 along one edge thereof. Flap 17 and panels 13, 14, 15 and 16 are separated by fold lines 18 running longitudinally of the blank 12. Panels 13, 14, 15 and 16 have respective closure flaps 19, 20, 21 and 22 depending therefrom and separated by a transverse fold line 23. Inner flaps 20 and 21 have connector tabs 24, 25 depending therefrom as shown in FIG. 1. Flap 22 is as long as panels 13 and 15 are wide. Thus, when a carton is formed, flap 22 extends right across the bottom of the carton and on the inside thereof.

A knocked-down carton may be formed by folding flap 20 against panel 14 and folding flap 21 against panel 15. Tab 24 is folded in the reverse direction to the fold of flap 20. Thus tab 24 is folded against flap 20. Similarly tab 25 is folded aginst flap 21. Flap 19 is folded against panel 13 whilst flap 22 is folded against panel 16. Thus all of the flaps 19, 20, 21 and 22 are folded along line 23. Panel 16 is folded along line 18 to enable flap 22 to be bonded to tab 25 whilst panel 13 is folded along line 18 to enable flap 19 to be bonded to tab 24. Flap 17 is bonded to the edge of panel 13.

In this knocked down attitude, panels 13, 14, 15 and 16 extend in co-planar relationship, one pair being disposed above the other pair of panels. As the panels are moved apart to their rectangular box-like configuration, flaps 19 and 20 automatically move downwardly to form a base portion for the carton. The carton is locked into this position by forcing the largest base flap 22, which is of a shape substantially conforming to the shape or cross-section of the base of the carton, into its fully formed position. Flap 22 overlies panels 19, 20 and 21 to provide a continuous internal supporting surface. Thereupon the carton is relatively rigid and the placement of produce or the like therein will maintain the largest flap 22 in its form maintaining position.

Figure 3:
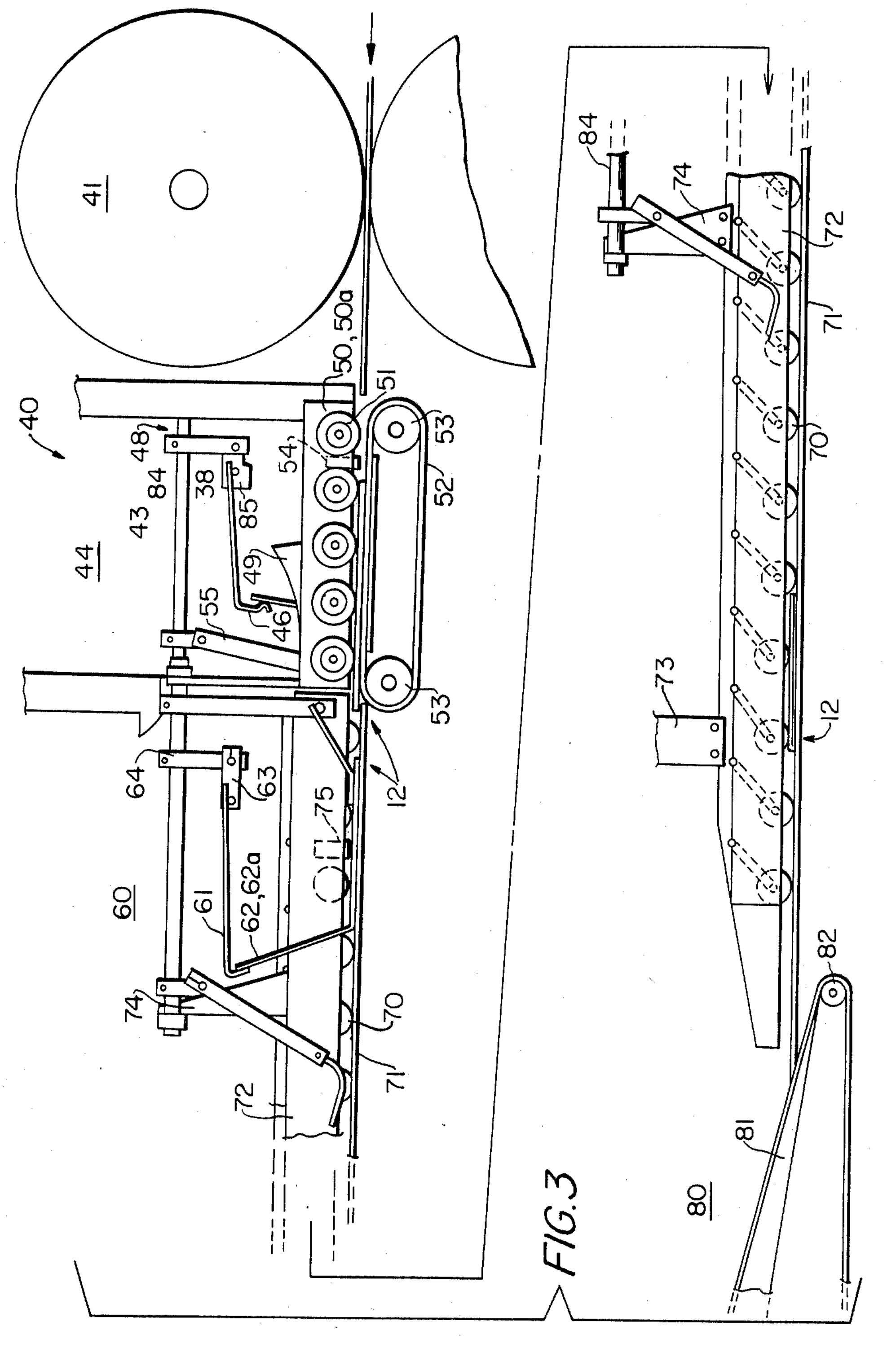
FIG. 3 is a side view of the main operative portion of a carton forming apparatus.
Figure 4:
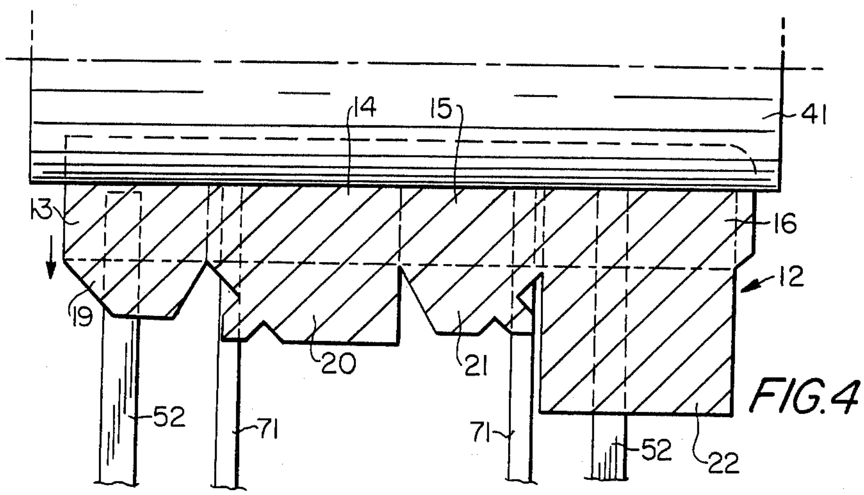
FIGS. 4 to 9 illustrate sequences in the forming of the crash-lock carton.
Figure 5:
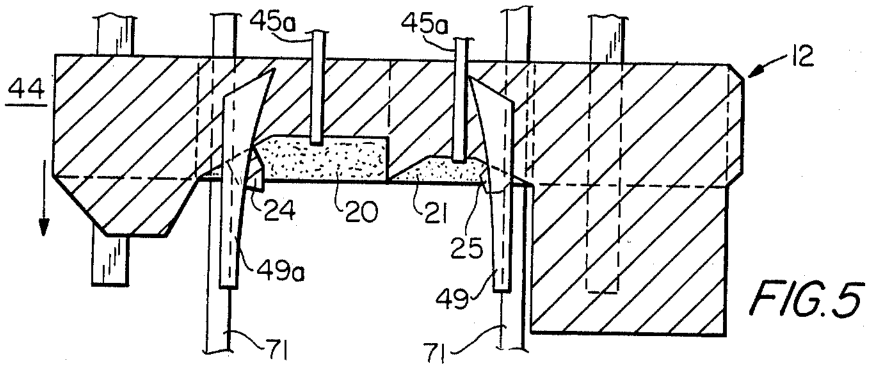

The improved apparatus of an embodiment of the invention is illustrated in FIGS. 3 to 11, with FIGS. 4 to 11 being of particular assistance in understanding the operation of the preferred apparatus. The figures only show that portion of the apparatus 40 downstream of exit rollers 41 of a printing head to the point downstream of the last forming station 80. The portion of the apparatus illustrated includes a frame 43 to which various items of the apparatus are secured. A first carton formed station 44 includes engagement means comprising two transversely spaced arms 45, 45*a*. Arms 45, 45*a* have hooked ends 46 and are pivotally coupled by pin or shaft 47 to mounting 48 secured to the frame 43. As shown in FIG. 5, arms 45, 45*a* are spaced apart laterally so as to engage the edges of flaps 20, 21 when the blank 12 moves through the apparatus. Also at the first forming station 44 are two laterally spaced anvils or ploughs 49, 49*a* best seen in FIG. 5. Ploughs 49, 49*a* ensure that tabs 24, 25 are folded in the reverse direction to the folding of flaps 20, 21. The ploughs are inclined so that they each present a raised upstream end. The ploughs are fixed relative to plates 50, 50*a* (only one of which is visible in FIG. 3). Adjacent the first station 44 are a pair of holding and conveying means comprising rollers 51 and belts 52 arranged to travel over rollers or pulleys 53. The other holding and conveying means is transversely spaced from the one visible in FIG. 3. Either or both the rollers or belts may be driven to convey the blank. The blank is engaged by these means and driven through the apparatus by them. As shown in FIG. 3 the blank is held between the rollers 51 and the belts 52. The belts 52 (as shown in FIG. 4) locate adjacent the underneath surface of panels 13, 16 and flaps 19, 22. A bonding station 54 is provided to apply bonding agent to flap 17. Plates 50, 50*a* are secured to the frame 43 by members 55, 55*a* (member 55*a* not visible).

A second carton forming station 60 has engagement means in the form of arms 61, 61*a*. These arms have hooked ends 62, 62*a*. Arms 61, 61*a* are pivotally coupled at 63 to a respective mounting 64 which is in turn connected to the frame 43. Arms 61, 61*a* are spaced apart further than arms 45, 45*a* and engage and lift flaps 19 and 22. All of the lifting arms normally are vertically aligned but move freely from that position when engaged by edges of flaps of the blank as the latter is moved through the apparatus. Once the blank has moved beyond the influence of an arm, the arm returns to its initial position under the influence of gravity.

Second holding and conveying means include a first combination of rollers 70 and belts 71 beneath the rollers. A second similar combination of rollers and a belt is positioned transversely spaced from the first. The spacing between the first and second combination is less than the spacing between the pair of roller/belt combinations at the first forming station. Either or both the rollers or belts may be driven to convey the blank. The rollers 70 are preferably spring biased to make the combination suitable for holding and conveying varying thicknesses of the folded blank. Rollers 70 are mounted relative to a plate 72 which in turn is mounted relative to the frame by members 73, 74. A pair of bonding stations 75 are arranged at transverse spaced locations to apply a bonding agent, such as glue, to tabs 24, 25.

A third forming station 80 comprising a pair of belts 81, each driven over a series of respective rollers 82 are provided for folding panel 13 and flap 19 over onto panel 14 so that flap 19 is bonded to tab 24 and panel 16 and flap 22 over onto panel 15 so that flap 22 is bonded to tab 25. One belt/roller combination is provided either side of the apparatus and extending in the direction of travel of the blank. The first roller of each series rotates about a substantially horizontal axis extending transversely to the apparatus. The axis of rotation of successive downstream rollers of the series is progressively altered so that intermediate rollers rotate about inclined axes, the inclination becomes greater until the final roller of the series once again has a horizontal axis of rotation. In this way the belt is initially horizontal and gradually turns inwardly so as to lift the outer portion of the blank as it moves therealong to fold same inwardly to overlie the central portions of the blank.

From FIGS. 4 to 9 it will be seen that the blank 12 enters the holding and conveying means of the first station which transports the blank from the exit rollers to a discharge portion (not shown) rearwardly of the belt of holding and conveying means of the second station which extends along beneath the path of the blanks 12. In the conventional apparatus there are provided a series of pressure applying retaining rollers adapted to hold the blanks firmly against the conveying surface so that the blanks will move therewith through the respective forming stations. These rollers commonly extend from the large exit rollers to the opposite end of the conveyor, however in the present apparatus the pressure applying rollers 70 associates with the belts 71 are terminated in spaced relationship with the exit rollers 41 and in place thereof there are provided the series of pressure applying rollers 51 and a corresponding conveyor belt 52 therebeneath disposed outwardly of the pressure applying rollers 70 and at each side of the belts 71. The relative position of the holding and conveying means of the first and second stations can be seen in FIGS. 3, 4 and 5.

It will be seen that as the blank 12 is fed onto the first holding and conveying means which includes both rollers 51 and belts 52, it is retained therebetween, firstly by the rollers 51 above the belts 52 whereby the blank is fed past the engagement means comprising arms 45, 45*a* towards and into the second conveying means comprising rollers 70 associated with the belts 71. The latter rollers 70 in this embodiment are spring loaded into engagement with the blank in order to accommodate the variation and thickess thereof which results from the folded state of the blank as it is fed thereto and resulting in doubling and/or tripling the effective thickness of the blank beneath these rollers 70.

The blank 12 is advanced base first towards the first forming station 44 as shown in FIG. 5 in which the arms 45, 45*a* engage over the leading ends of the flaps 20, 21 to lift same, as the blank 12 advances and thus causes the latter to pivot rearwardly with respect to the side panels of the blank. As the flaps 20, 21 are pivoted backwardly relative to the side panels 14, 15 the connector tabs 24, 25 engage the inclined anvil members 49, 49*a* which converge in the upstream direction towards the conveying means constituted by rollers 70 and belts 71. These anvil members 49, 49*a* prevent the connecting tabs being carried rearwardly with the respective side panels 14, 15 and thus in effect they cause the connecting tabs 24, 25 to be folded in the reverse direction to the respective side panels 14, 15.

Figure 6:
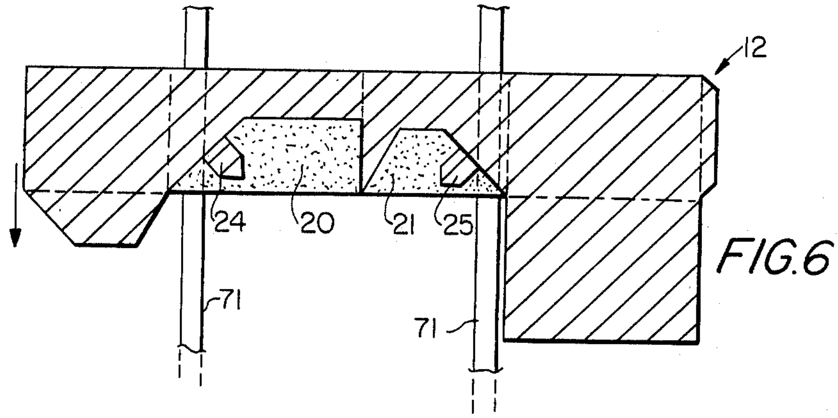
Figure 7:
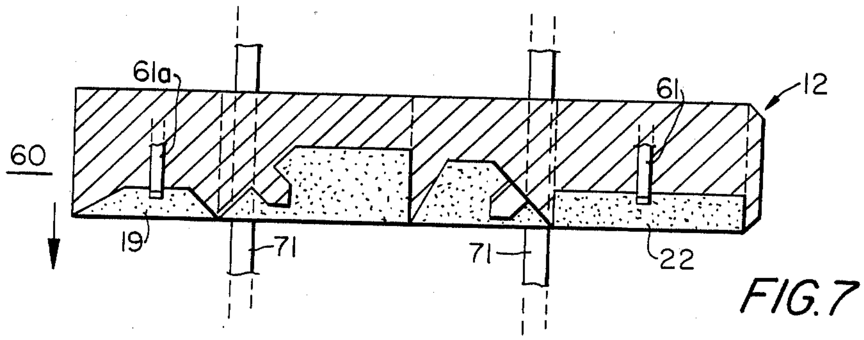
Figure 8:
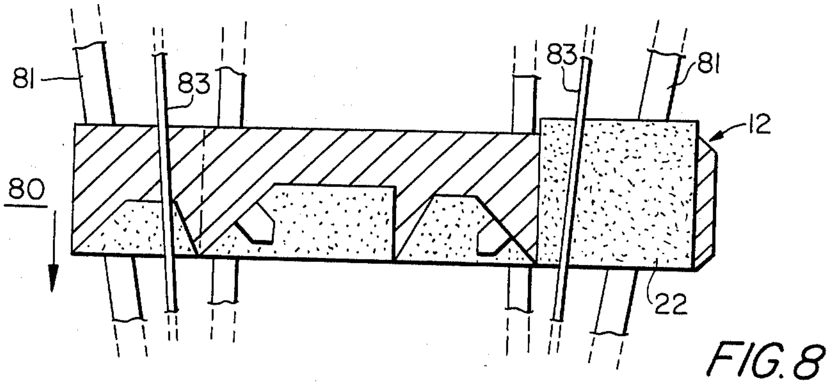

The conveying means comprising rollers 51 and belts 52 feed the blank through the first forming station 44 whereafter the blank 12 is engaged by the rollers 70 and corresponding belts 71 whereby the blank in its partly folded attitude as shown in FIG. 6, is carried thereon to the next forming station 60 as illustrated in FIG. 7 at which the outer flaps 19 and 22 are folded rearwardly by the hooks 61, 61*a* in the manner previously described.

It will be seen that the belts 71 and the rollers 70 engage the blank 12 above a folded portion thereof adjacent the connecting tabs 24, 25 and in order to cope with the thickness variations of the partly formed blank the rollers 70 are spring loaded so that they maintain clamping pressure irrespective of the instantaneous thickness of the blank 12. In this second forming station 60 further freely pivotal arms 61, 61*a* supported outwardly of the belts 71 engage flaps 19, 22 to fold same rearwardly. At the same time, or soon thereafter, in a third forming station 80 further side conveyor means comprising belts 81 are lead around first rollers 82 of a series of rollers. These rollers are rotatable about substantially horizontal axes and the subsequent rollers rotate about progressively varied axes as previously discussed, such that the belts 81 at one end are substantially horizontal and gradually turn inwardly so as to lift the outer portions of the blank 12 as they move therealong and fold same inwardly to overlie the central portions of the blank. The joining flap 17 may be bonded to the opposite portion of the blank when folded to form the necessary knocked-down carton. Retaining rails 83 shaped to conform to the contour of the belts 81 are provided to ensure controlled pivoting of the outer side panels of the blank.

Figure 9:
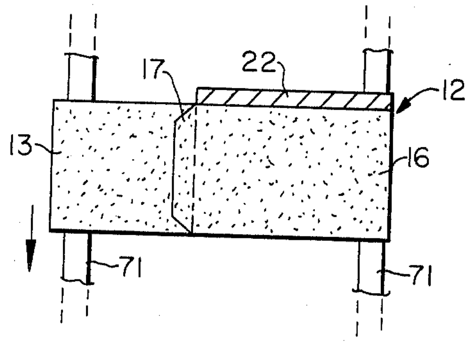
Figure 10:
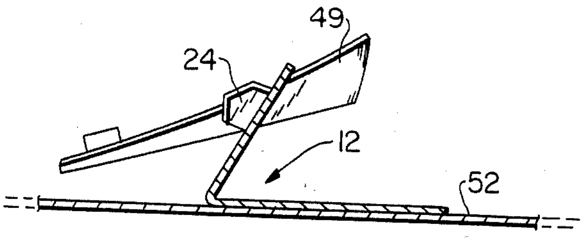
FIGS. 10 and 11 are perspective views illustrating the operation of the engagement means for folding a closure flap and connector tab.
Figure 11:
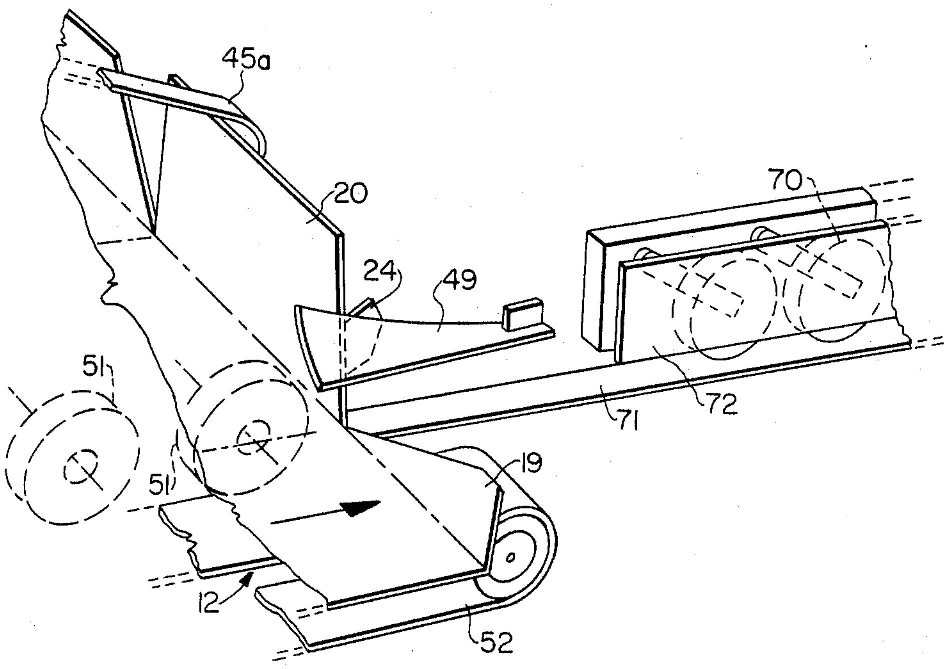

The blank in its folded knocked-down attitude can be seen in FIG. 9 with the base panel 22 sandwiched between the overlapping side panels 13 and 16.

Each arm 61, 61*a*, 45, 45*a* is illustrated in FIG. 3, is supported on a frame 43 which may comprise a universal mounting including a longitudinally extending bar 84 along which they may be adjusted. The bar 84 is supported substantially parallel to the belts 71. The mounting 48 is adjustably fixed to the bar 84 and may pivot about the bar 84 and supporting a laterally extending shaft 47 extending outwardly from the first part 38. A supporting part 85 is connected pivotally to the shaft 47. There are provided locking means for locking the second body part 85 in selected angular relationship about the shaft 47 at any selected laterally adjustable position thereon and for securing the first mounting part 48 in selected rotational position about the longitudinal bar 84.

In the conventional forming apparatus for forming regular slotted containers such as an S&S model ZLM machine, the main conveyor belt extends from a portion adjacent the exit rollers 41 to the downstream discharge end of the apparatus. In order to modify such apparatus for forming crash-lock containers, the retaining means for holding the blanks on the conveyor for movement therewith is cut away adjacent the rollers 41 as illustrated and the pair of conveying means comprising belts 51 and rollers 52 are provided at each side and spaced outwardly from the other conveying means. In addition the engagement means at the first station are adjustably supported so as to provide the necessary folding operations as described above and additional bonding stations are provided to deposit bonding agent such as glue on the connecting tabs as the blank progresses along the conveyor. The parts to be bonded are brought together as the blank is folded during the latter part of the conveyor assembly.

Thus one bonding station is provided to deposit bonding agent onto flap 17. This station may be located upstream of the first forming station or adjacent that station. Further bonding stations are provided to deposit bonding agent onto connect tabs 24, 25.

These further stations may be provided downstream of the first forming station and between the station and the third forming station.

Of course the apparatus described relates to forming a particular type of crash-lock container. Other types of folding containers may be formed on the above described apparatus and additional hooks and associated anvils may be incorporated for this purpose. Also when not used for forming crash-lock containers, the arms may be pivoted to a position free from the conveying path whereby the apparatus may be used for forming regular slotted containers.

We claim:

1. An improved crash-lock carton forming apparatus for forming from a blank a knock-down carton, the blank having a first outer side panel, second and third inner side panels, and a fourth outer side panel, first, second, third, and fourth closure flaps connected by a fold line to the first, second, third and fourth side panels respectively, the second and third closure flaps having depending connection tabs and an upstream end of the apparatus may, in use, be located adjacent exit rollers of a printing station, said apparatus including:

a first carton forming station adjacent the upstream end of the apparatus, said first station having a pair of laterally spaced engagement means for lifting the second and third closure flaps and folding them against the second and third side panels respectively and folding the connection tabs in reverse direction to the direction of the second and third closure flaps;

a second carton forming station downstream of the first station and including engagement means for lifting the first and fourth closure flaps and folding them against the first and fourth side panels respectively;

a bonding station for applying bonding agent to said connection tabs;

a third carton forming station for folding the first and fourth side panels and the overlying first and fourth flaps over onto the second and third side panels respectively to thereby bond the tab of said second flap to the first flap and the tab of the third flap to the fourth flap;

first holding and conveying means extending from adjacent the exit rollers and the downstream end of the first station for engaging the first and fourth closure flaps and side panels and conveying the blank downstream of the apparatus; and second holding and conveying means extending from adjacent the downstream end of the first station to the downstream end of the third station for engaging the second and third side panels and conveying the blank through said second and third stations.

2. Apparatus as claimed in claim 1, wherein said first engagement means comprises a pair of transversely spaced lifting arms, each having a hooked end for engaging an edge of a respective one of the two flaps for lifting the flap and a pair of transversely spaced ploughs immediately downstream of the lifting arms, a respective one of said ploughs being operatively associated with one of said lifting arms for folding the connector tabs of the respective flap in the reverse direction.

3. Apparatus as claimed in claim 2, wherein said engagement means of said second station comprises transversely spaced lifting arms each having hooked ends for engaging an edge of a respective one of the two remaining flaps for lifting the remaining flaps, said lifting arms of said second station being spaced apart to a further extent than the spacing of said arms of said first station.

4. Apparatus as claimed in claim 1 wherein said first holding means comprises two transversely spaced longitudinally extending continuous belts or webs of a series of longitudinally spaced rollers associated with and spaced above each of said belts or webs, either or both the rollers or webs being driven to transport the blanks therebetween, one said belt and associated spaced rollers engaging opposite surfaces of the first side panel of the first closure frame and the other said belt and associated spaced rollers engaging opposite side surfaces of the fourth side panel and the fourth closure flap to thereby drive the blank through the first station.

5. Apparatus as claimed in claim 4, wherein said second holding means comprises two transversely spaced longitudinally extending continuous belts or webs and a series or longitudinally spaced rollers associated with and spaced above each of said webs, said webs and said associated rollers of the second holding means being spaced apart to a lesser extent than said webs and said rollers of said first holding means, either or both the rollers or webs of said second holding means being driven to transport the blank therebetween whereby one said belt and spaced rollers of said second holding means engage a surface of said second side panel and a surface of said folded over first side panel and the other said belt and spaced rollers of said second holding means engage a surface of said third side panel and a surface of said folded over fourth side panel.

6. Apparatus as claimed in claim 5, wherein said rollers of said second holding means are biased towards said associated webs.

7. Apparatus as claimed in claim 3, wherein said lifting arms of said first and second engagement means are pivotally mounted to a frame member of the apparatus and are normally vertically aligned and may be pivoted away from that position by a flap when lifting that flap and may return to the vertical position under the influence of gravity.

8. Apparatus according to claim 1, including a further bonding station upstream of said first forming station for applying a bonding agent to a peripheral joining flap of the blank.

9. A method of converting a carton forming machine of the type which bonds a joining flap of a blank to a side panel of a regular slotted carton or half slotted carton into a machine for forming knocked down crash-locked cartons, the machine having holding and conveying means extending from adjacent exit rollers of a printing station of an upstream end to a downstream location terminating upstream of a forming station for folding the blank to bond the joining flap to the side panel of the blank, said method including the steps of:

replacing the holding and conveying means of the machine with first and second holding and conveying means, said first means being upstream of said second means and extending from adjacent the exit rollers to a downstream end of a first carton forming station, said second, means extending from adjacent the downstream end of the first forming station to a downstream end of a second forming station, the blank having first, second, third and fourth side panels and associated first, second, third and fourth closure flaps respectively, said first holding and conveying means engaging the first side panel and the associated closure flap and the fourth side panel and the associated closure flap whereas the second holding and conveying means engages the second and third side panels and surfaces of the first and fourth side panels when the first and fourth side panels are folded onto the second and third side panels;

positioning first engagement means adjacent said first conveying means, said first conveying means and said first engagement means providing the first carbon forming station at which the second and third flaps are lifted and folded against the associated second and third side panels whilst folding connector tabs associated with the flaps in the reverse direction to the direction of folding of the second and third flaps;

positioning second engagement means adjacent said second conveying means, said second engagement means and said second conveying means providing the second carton forming station at which the first and fourth closure flaps are lifted and folded against the associated first and fourth side panels; and providing a third carton forming station for folding the first and fourth side panels over onto the second and third side panels respectively to thereby bond the first and fourth closure flaps to respective ones of the connector tabs.

10. The method of claim 9 wherein the conveying means both comprise transversely spaced belts having a series of rollers associated with each of the belts, the method including spacing the belts and rollers of the first conveying means further apart than the belts and rollers of the second conveying means.

11. The method of claim 9 including providing a bonding station adjacent said first carton forming station and applying bonding agent to the connector tabs.

12. The method of claim 9, including providing a bonding station adjacent the second carton forming station and applying bonding agent to the joining flaps.

13. The method of claim 9 wherein the engagement means both include two transversely spaced lifting arms and wherein the arms are pivotally and adjustably mounted and return to an inoperative position under the influence of gravity.

* * * * *